United States Patent [19]

Colling

[11] Patent Number: 5,473,140
[45] Date of Patent: Dec. 5, 1995

[54] WELDING NOZZLE RETAINING RING

[75] Inventor: Ronald W. Colling, Appleton, Wis.

[73] Assignee: Miller Electric Mfg. Co., Appleton, Wis.

[21] Appl. No.: 209,719

[22] Filed: Mar. 14, 1994

[51] Int. Cl.$^6$ ................................................ B23K 9/00
[52] U.S. Cl. .................................................. 219/137.42
[58] Field of Search ........................ 219/137.31, 137.42, 219/137.43, 75; 285/345, 346; 411/260, 371, 531

[56] References Cited

U.S. PATENT DOCUMENTS

| | | | |
|---|---|---|---|
| 2,659,797 | 11/1953 | Anderson et al. | 219/75 |
| 3,466,383 | 9/1969 | Decker | 285/345 |
| 3,761,867 | 9/1973 | Churla | 411/531 |
| 4,268,046 | 5/1981 | Nisper | 285/345 |
| 4,300,034 | 11/1981 | Schneider et al. | 219/137.42 |
| 4,672,163 | 6/1987 | Matsui et al. | 219/137.43 |

Primary Examiner—Clifford C. Shaw
Attorney, Agent, or Firm—Donald Cayen

[57] ABSTRACT

A welding nozzle retaining ring has a polygon configuration with alternating peaks and straight segments. One segment is cut. The retaining ring is sized such that the peaks lie along a circle having a diameter that is slightly greater than the inner diameter of a welding gun nozzle or similar tubular component. The midpoints of the inner surfaces of the retaining ring segments lie along a second circle having a diameter slightly smaller than the diameter of a groove in a welding gun adapter or similar cylindrical component. With the retaining ring in the adapter groove, the welding nozzle is pushed over the adapter and the retaining ring. The nozzle inner diameter contacts and depresses the peaks of the retaining ring and simultaneously causes the segments to bend around the adapter groove. The retaining ring acts as a circumferential spring that provides a rigid radial connection between the nozzle and the adapter while enabling the nozzle to slide against friction along the adapter. The polygon design of the welding nozzle retaining ring enables the nozzle and adapter to be manufactured with increased tolerances while providing improved performance.

15 Claims, 2 Drawing Sheets

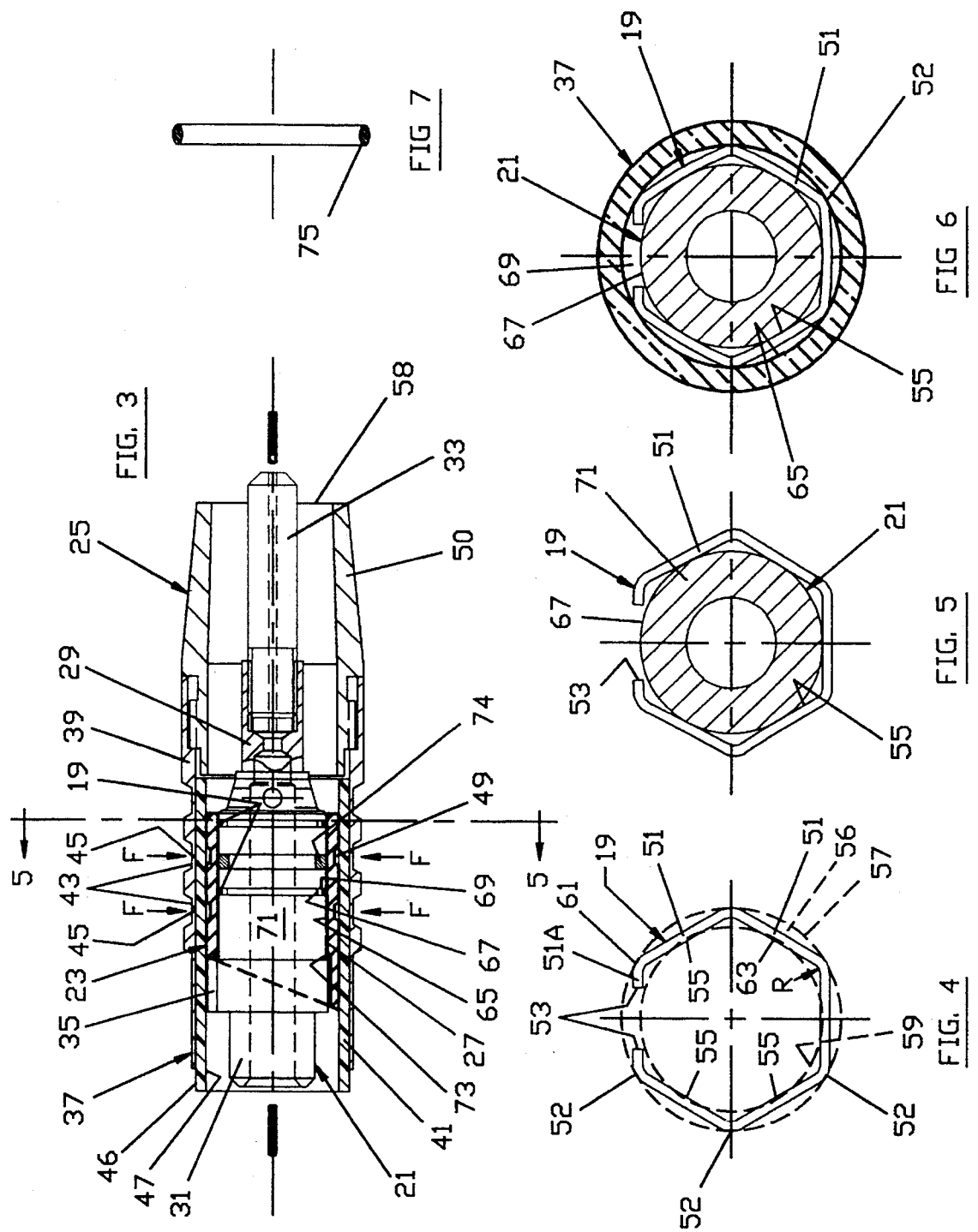

WELDING NOZZLE RETAINING RING

BACKGROUND OF THE INVENTION

1. Field of the Invention

This invention pertains to arc welding, and more particularly to apparatus for assembling a wire welding gun.

2. Description of the Prior Art

Arc welding requires that an inert shielding gas surround the welding arc. The shielding gas is supplied to a welding gun and flows out the gun through a nozzle. The nozzle commonly surrounds a welding wire and directs the gas to the region of the workpiece being welded. Consequently, the nozzle is an important part of a wire welding gun.

To properly perform its function, the welding gun nozzle must be durable and convenient to remove, reinstall, and adjust on the gun. The nozzle must also be adequately insulated from current-carrying components of the welding gun. It is also important that the nozzle not attract weld spatter.

It is known to provide a slip-fit connection between a welding gun nozzle and a nozzle insulator or other component of the gun. Specifically, spring rings have been used that are intended to simultaneously grip the nozzle inner diameter while locked in a groove in the insulator. The prior spring rings are typically round rings made of wires having circular cross sections. Looking at FIGS. 1 and 2, relevant portions of a typical prior wire welding gun 1 are shown that pertain to a slip-fit assembly of an insulator 4 and a nozzle 3. A contact tip adapter 2 may secure the insulator 4 to a gun tube 6 of a welding gun handle, not shown, in well known manner. A welding contact tip 10 is threaded into the contact tip adapter 2. A welding wire 12 passes through the welding gun body, not shown, and eventually through the welding contact tip 10.

The insulator 4 is manufactured with two or more spaced apart circumferential grooves 5. In each groove 5 is a round spring ring 7. The spring rings 7 are cut, as at reference numeral 8, to enable them to be assembled into the insulator grooves 5. If there were no radial clearances between the spring rings 7, adapter grooves 5, and nozzle inner diameter 11, a gripping force would be set up simultaneously between the spring rings 7, the groove roots 15, and the nozzle inner diameter 11.

In actuality, however, clearances between the insulator 4, spring rings 7, and nozzle 3 are necessary to provide the required freedom of movement of the spring rings, and to allow for the tolerances inherent in the manufacture of the three components. Consequently, the width of the grooves 5 is slightly greater than the diameter of the wire from which the spring rings 7 are formed. The depth of the grooves is chosen to adequately clear the spring ring inside diameter. Therefore, a radial clearance exists between the spring rings 7 and the roots 15 of the grooves 5. Similarly, an axial clearance exists between the spring rings 7 and the sides 16 of the grooves. Axial play, i.e., motion in the directions of arrow 13, of the nozzle 3 relative to the insulator 4 is determined by the axial clearance between the spring rings and the sides 16 of the insulator grooves. Radial play of the nozzle relative to the insulator is determined by the radial clearances between the nozzle inner diameter 11 and the insulator outer diameter 9, and by the radial clearances between the spring rings and the adapter groove roots 15. Such radial and axial clearances can then combine to undesirably cause a loosened fit between the nozzle and the insulator. Further, because of the relatively long overhang of the nozzle orifice 17 from the spring rings 7, any radial clearance between the spring rings, nozzle inner diameter 11, and insulator grooves 5 is magnified at the nozzle orifice 17. Accordingly, it is highly desirable that the clearances associated with the spring rings be minimized in order to keep wobble at the nozzle orifice 17 within acceptable limits. However, machining tolerances tight enough to eliminate nozzle wobble normally render the insulator and nozzle undesirably expensive.

Thus, a need exists for improvements in the design of wire welding guns.

SUMMARY OF THE INVENTION

In accordance with the present invention, a welding nozzle retaining ring is provided that enables a tube to be slip-fit over a cylinder with no radial play. This is accomplished by forming the retaining ring into a polygon configuration with alternating peaks and straight segments.

The retaining ring is formed from a wire having a relatively small cross section. The dimensions of the retaining ring are chosen to suit the particular tube and cylinder with which it is to be used. The retaining ring is normally placed in a circumferential groove in the cylinder, so the groove dimensions also are a factor in the retaining ring design.

In general, the retaining ring is formed such that in its relaxed state the peaks lie along a first circle that has a diameter slightly greater than the inner diameter of the tube, and the midpoints of the inner surfaces of the straight segments lie along another circle that has a diameter slightly smaller than the diameter of the cylinder groove. Consequently, when the retaining ring is placed within the cylinder groove, the peaks protrude out of the groove.

A lead-in chamfer on the tube inner diameter enables the tube to be pushed over the retaining ring. The chamfer bears against the ring peaks and elastically depresses them such that they lie along a circle having the same diameter as the tube inner diameter. Depression of the peaks simultaneously causes the midpoints of the segments to bear against the cylinder groove and to elastically bend the segments to partially conform to the groove diameter. The result is that the ring is deformed into a somewhat more circular shape. Elastic deflection of the ring produces a restoring force that causes the ring peaks and segments to simultaneously grip the tube inner diameter and cylinder groove, respectively, with tight fits and without radial clearances between the tube and the ring peaks or between the cylinder groove and the ring segments. In that manner, a rigid radial connection is established between the tube and the cylinder. Further, since the retaining ring has the capability of deflecting elastically to suit the tube and cylinder, increased tolerances for those components are permitted. Consequently, their manufacturing costs are reduced. It is not necessary that the retaining ring be made from a material having a circular cross section. Elliptical, square, or rectangular cross sections are also feasible. Further, the interplay between the ring cross section, number of segments, cylinder groove diameter, and tube inner diameter can be tailored to suit different applications.

The method and apparatus of the invention, using a multi-segmented elastic ring, thus provides a slip-fit assembly of a tube onto a cylinder. The assembly maintains a radially rigid connection between the tube and cylinder while enabling both components to be economically manufactured.

Other advantages, benefits, and features of the present

BRIEF DESCRIPTION OF THE DRAWINGS

FIG. 3 is a longitudinal cross sectional view of a portion of a typical wire welding gun that utilizes the present invention.

FIG. 4 is a front view on an enlarged scale of the welding nozzle retaining ring of the present invention.

FIG. 5 is a partial cross sectional view on an enlarged scale taken along lines 5—5 of FIG. 3 showing the retaining ring in place in an adapter groove.

FIG. 6 is a view similar to FIG. 5, but showing the retaining ring in an assembled condition.

FIG. 7 is a cross sectional view of a spring ring having an alternate cross section.

DETAILED DESCRIPTION OF THE PREFERRED EMBODIMENT

Figure 1:
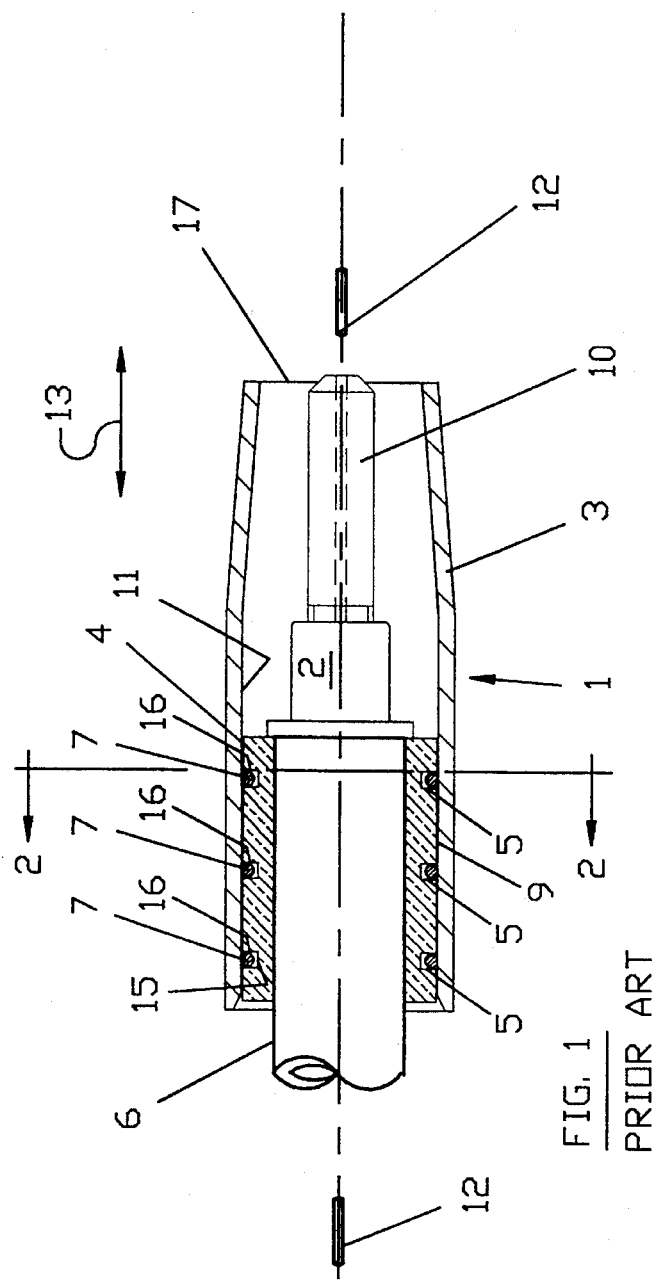
FIG. 1 is a simplified longitudinal cross sectional view of a portion of a typical prior welding gun nozzle, insulator, and spring rings.
Figure 2:
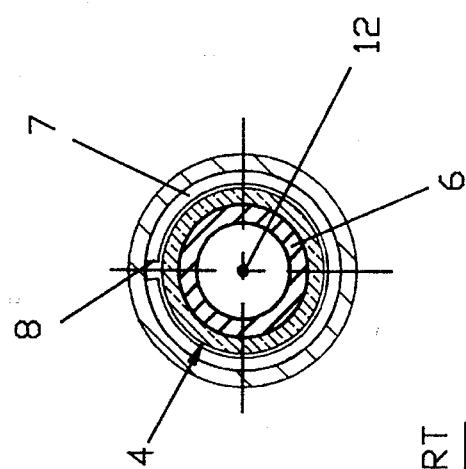
FIG. 2 is a cross sectional view taken along line 2—2 of FIG. 1.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIG. 3, a pair of welding nozzle retaining rings 19 are illustrated that include the present invention. The welding nozzle retaining rings 19 are particularly useful for providing a snug friction fit between an adapter 21 and an insert 23 of a wire welding gun partially shown at reference numeral 25. However, it will be understood that the invention is not limited to welding applications.

The particular wire welding gun 25 shown is described in detail in U.S. Pat. No. 5,380,980. However, that wire welding gun is merely representative of a wide variety of welding gun designs that can advantageously incorporate the welding nozzle retaining rings 19.

Briefly, the adapter 21 of the illustrated wire welding gun 25 has a cylindrical surface 27 that lies between the adapter front end 29 and its back end 31. The adapter back end 31 fits more or less permanently into a body, not shown, of the wire welding gun. A welding contact tip 33 is screwed into the adapter front end 29. There is a key 35 secured to the adapter near its back end.

The tubular insert 23 is the innermost component of a three-component extension assembly 37. The other components of the extension assembly 37 are a tubular sleeve 39 and a tubular insulator 41. The insert 23, sleeve 39, and insulator 41 are swaged into the unitary extension assembly by applying inwardly directed forces partially around grooves 43 in the sleeve. As illustrated, the swaging forces have not yet been applied. The swaging forces deform the sleeve material 45 at the roots of the grooves 43 into the insulator outer diameter 46. In turn, the insulator deforms such that lobes form on the insulator inner diameter 47 and enter grooves 49 in the insert outer diameter. In that manner, the sleeve, insulator, and insert are assembled to each other without fasteners or other secondary methods. A nozzle 50 with an orifice 58 is screwed or otherwise connected to the sleeve.

In accordance with the present invention, the welding nozzle retaining ring 19 provides a snug friction fit between the extension assembly 37 and the adapter 21 while permitting the extension assembly and the adapter to be manufactured with relatively generous tolerances. FIG. 4 shows the welding nozzle retaining ring in a relaxed state as it is formed on a spring winder or similar machine. The retaining ring 19 has a number of straight segments 51 with peaks 52 between adjacent segments such that the retaining ring has the configuration of a polygon. Each segment 51 has a straight inner surface 55 with a midpoint on it. One of the segments 51A has a cutout 53.

The particular configurations and dimensions of the welding nozzle retaining ring 19 are chosen to suit the application with which it is to be used. In the illustrated construction, the retaining ring has the configuration of a regular hexagon, but more or fewer segments can be used depending on the circumstances. The nominal size of the retaining ring is such that it generally matches an annular space defined by concentric outer and inner cylindrical surfaces. In FIG. 4, the relaxed retaining ring is shown superimposed on two concentric circles 57 and 59 that represent outer and inner cylindrical surfaces, respectively. Reference numeral 56 represents the annular space between the two cylindrical surfaces 57 and 59. The retaining ring is designed to have a small amount of interference 61 between the ring peaks 52 and the outer cylindrical surface 57. There is also a small amount of interference 63 between the midpoints of the inner surfaces 55 of the respective retaining ring segments 51 and the inner cylindrical surface 59. For clarity, the interferences 61 and 63 are shown greatly exaggerated.

In practice, the outer circle 57 of FIG. 4 represents the inner diameter 65 of the insert 23 of the extension assembly 37 of FIG. 3. The inner circle 59 of FIG. 4 represents the root 67 of a groove 69 machined in the central cylindrical section 71 of the adapter 21. Thus, in its relaxed state, the welding nozzle retaining ring 19 would interfere at its peaks 52 with the insert inner diameter 65 and at the midpoints of its segment inner surfaces 55 with the root 67 of the adapter groove 69. The width of the adapter groove 69 is very slightly greater than the diameter of the wire from which the retaining ring 19 is made.

FIG. 5 shows the welding nozzle retaining ring 19 in place within the groove 69 of the adapter 21. Since actual interference between the retaining ring inner surfaces 55 and the adapter groove root 67 is not possible, the retaining ring acquires a slightly expanded profile relative to its relaxed profile of FIG. 4 when it is placed in the adapter groove. The expanded profile of the retaining ring of FIG. 5 is exaggerated for clarity.

Now turning to FIG. 6, a welding nozzle retaining ring 19 is shown in use to assemble the extension assembly 37 to the adapter 21. For assembly, the extension assembly is slid over the adapter central section 71 and the retaining rings. A chamfer 73 on the inner diameter 65 of the insert 23 contacts the ring peaks 52 and enables the insert inner diameter 65 to elastically depress the retaining ring peaks to lie against the insert inner diameter. Consequently, the insert can be slid fully onto the adapter central section. Simultaneously, the depression of the ring peaks produces forces between the midpoints of the inner surfaces 55 of the ring segments 51 and the groove root 67. The combination of the depressive forces on the peaks and the outwardly directed forces on the midpoints of the segment inner surfaces causes the segments to bend. As a result, the retaining ring acquires a somewhat more circular profile. The elastic restoring force of the retaining ring material causes the peaks to grip the insert inner diameter and the segments to simultaneously grip the groove root. Accordingly, any attempt to slide the extension assembly off the adapter is resisted by a friction force created between the ring peaks and the insert inner diameter. An O-ring 74 prevents gas aspiration between the extension assembly and the adapter.

As is readily apparent, the welding nozzle retaining ring 19 does not depend on complete circumferential contact between it and the insert inner diameter 65 or the adapter groove root 67 for proper operation; contact at the ring peaks 52 and segment inner surfaces 55 is entirely sufficient to provide a rigid connection that has no radial clearance between the insert inner diameter and the retaining ring peaks or between the groove root and the retaining ring segments 51. The retaining ring therefore acts as a circumferential spring. As a result, the manufacturing tolerances for the groove 69 and the insert inner diameter can be loosened considerably compared with prior designs and still give greatly improved results. Even with the increased tolerances, the zero radial clearance at the two spaced apart retaining rings illustrated in FIG. 3 results in practically no wobble at the orifice 58 of the nozzle 50.

The welding nozzle retaining ring 19 is exceptionally versatile in that it can have a number of segments 51 that suit different applications. Particularly, it is contemplated that the number of segments will vary between three and approximately twelve. Other parameters include the diameter of the wire from which the retaining ring is formed. In general, smaller diameter wires allow looser manufacturing tolerances for the insert 23 and the adapter groove 69 than large diameter wires.

An example of a welding nozzle retaining ring 19 is as follows. The retaining ring is manufactured from music wire having a circular cross section with a diameter of 0.025 inches. The retaining ring has six segments 51. The distance between the inner straight surfaces 55 of two opposed segments is 0.454 inches. The inner diameter 65 of the insert 23 is 0.566 inches. The cutout 53 is 0.156 inches wide. The inside radius R at the retaining ring peaks is 0.03 inches. The diameter of the adapter groove root 67 is 0.464 inches. A tolerance of plus or minus 0.001 inches for the foregoing dimensions is acceptable and is well within economical manufacturing practice. The resulting assembly as shown in FIGS. 3 and 6 works very well, producing a frictional resistance to the sliding the extension assembly along the adapter 21 that is acceptable for the purpose of a wire welding gun. At the same time, the wobble at the orifice 58 of the nozzle 50 is minimal.

Further in accordance with the present invention, the wire from which the welding nozzle retaining ring of the present invention is made need not have a circular cross section. Turning to FIG. 7, the cross section of a welding nozzle retaining ring 75 is shown that has a elliptical cross section. The retaining ring 75 with the elliptical cross section provides a gentler angle of engagement with the chamfer 73 of the inner diameter 65 of the insert 23 of FIG. 3. Consequently, the retaining ring with the elliptical cross section results in easier installation and less wear to the insert inner diameter or other cylindrical inner surface. The other characteristics and dimensions of the retaining ring 75 are substantially similar to those described previously in connection with the retaining ring 19 having a circular cross section. In some instances, it may be desirable to employ a retaining ring having a square or rectangular cross section, and the present invention contemplates retaining rings having such cross sectional shapes.

In summary, the results and advantages of wire welding guns with adjustable nozzles can now be more fully realized. The welding nozzle retaining ring 19 provides a radially rigid connection between an extension assembly 37 and an adapter 21 that practically eliminates wobble at the nozzle orifice 58. This desirable result comes from using the combined elastic deflections of the retaining peaks 52 and segments 51. The retaining ring deflects to suit the annular space within which it is confined, and the retaining ring restoring forces cause it to act as a circumferential spring that simultaneously grips the insert and the adapter.

The construction of the welding nozzle retaining ring 19 permits relatively generous manufacturing tolerances for the adapter groove 69 and the insert 23. Consequently, in addition to the superior performance of the present invention, the costs associated with it may be lower than with the various types of prior spring rings.

Thus, it is apparent that there has been provided, in accordance with the invention, a welding nozzle retaining ring that fully satisfies the aims and advantages set forth above. While the invention has been described in conjunction with specific embodiments thereof, it is evident that many alternatives, modifications, and variations will be apparent to those skilled in the art in light of the foregoing description. For example, in some applications it may be desirable to machine grooves for the retaining rings in the insert inner diameter 65 rather than in the adapter outer diameter 27. In those situations, the retaining ring peaks would be depressed by and grip the root of the insert groove, and the retaining ring segments would be bent by and grip the adapter outer diameter. The operation and results of that assembly would be identical to those obtained by using the retaining rings 19 as previously described. Accordingly, it is intended to embrace all such alternatives, modifications, and variations as fall within the spirit and broad scope of the appended claims.

I claim:

1. A welding nozzle retaining ring comprising an elongated piece of elastic material having a uniform cross section along its length and first and second ends and being formed into a polygon configuration with alternate straight segments and peaks and with the first and second ends facing and being spaced from each other, the ring peaks lying generally along a first circle having a first predetermined diameter: the straight segments having respective inner surfaces each with a midpoint thereon; the midpoints of the segments inner surfaces lying along a second circle having a second predetermined diameter less than the first predetermined diameter.

2. The welding nozzle retaining ring of claim 1 wherein the elongated piece of elastic material has a round cross section.

3. The welding nozzle retaining ring of claim 2 wherein:

a. the retaining ring is formed into a regular hexagon configuration;

b. the diameter of the elastic piece of material is approximately 0.025 inches; and c. the diameter of the second circle is approximately 0.454 inches.

4. The welding nozzle retaining ring of claim 1 wherein the elongated piece of elastic material has an elliptical cross section.

5. In combination with a cylinder having an outer diameter and a tube having an inner diameter concentric with the cylinder outer diameter and cooperating therewith to define an annular space therebetween, apparatus for frictionally retaining the cylinder and tube together with a radially rigid connection comprising an elastic ring having a plurality of straight segments arranged into a polygon with respective adjacent segments joining at peaks, one of the segments defining a cutout therein, the peaks lying generally along a first circle having a diameter slightly greater than the diameter of the tube inner diameter, the segments having respective inner surfaces with midpoints thereon that lie along a second circle having a diameter slightly smaller than the diameter of the cylinder outer diameter, the ring being assembled onto the cylinder and the tube being slid over the cylinder and ring to elastically depress the ring peaks into the annular space and to simultaneously elastically bend the ring segments at their respective midpoints against the cylinder outer diameter, so that the deflected ring produces a restoring force that causes the ring peaks to grip the tube inner diameter and the ring segment midpoints to grip the cylinder outer diameter and thereby produce a radially rigid connection between the cylinder and the tube.

6. The combination of claim 5 wherein the ring is made of an elastic wire having a round cross section.

7. The combination of claim 6 wherein:
   a. the ring segments are arranged into a regular hexagon;
   b. the diameter of the first circle containing the ring peaks is approximately 0.0025 inches greater than the tube inner diameter;
   c. the diameter of the second circle containing the midpoints of the inner surfaces of the ring segments is approximately 0.0025 inches less than the cylinder outer diameter;
   d. the tube inner diameter is approximately 0.464 inches; and
   e. the ring cross section has a diameter of approximately 0.025 inches.

8. The combination of claim 5 wherein the ring is made of an elastic wire having an elliptical cross section.

9. A welding gun comprising:
   a. a tubular insert having a predetermined inner diameter;
   b. an adapter inside and concentric with the insert and having a plurality of spaced apart circumferential grooves with predetermined root diameters therein; and
   c. a plurality of elastic welding nozzle retaining rings assembled each in a respective adapter groove, each welding nozzle retaining ring having a plurality of straight segments having the polygon configuration with one of the segments defining a cutout, respective adjacent segments meeting at peaks that contact the insert inner diameter and the segments having respective inner surfaces that contact the associated adapter groove root to thereby provide a radially rigid connection between the insert and the adapter.

10. The welding gun of claim 9 wherein the insert inner diameter exerts a depression force on the welding nozzle retaining ring peaks and the adapter groove root exerts a bending force on the welding nozzle retaining ring segments, so that the welding nozzle retaining rings produce elastic restoring forces that enables the peaks to grip the insert and the segments to simultaneously grip the adapter groove roots and thereby create a friction force that resists removal of the insert from the adapter.

11. The welding gun of claim 9 wherein each welding nozzle retaining ring is formed from a wire having a round cross section.

12. The welding gun of claim 9 wherein each welding nozzle retaining ring is formed from a wire having an elliptical cross section.

13. A method of assembling a tube having a predetermined inner diameter over a cylinder having a predetermined outer diameter comprising the steps of:
   a. forming a length of elastic material into a ring having a plurality of segments arranged into a polygon configuration with respective adjacent segments joining at peaks that lie along a first circle having a diameter greater than the tube inner diameter;
   b. creating a cutout in one of the ring segments;
   c. placing the ring on the cylinder outer diameter;
   d. sliding the tube over the cylinder and the ring and contacting the ring peaks with the tube inner diameter;
   e. depressing the ring peaks with the tube inner diameter and simultaneously bending the ring segments with the cylinder outer diameter; and
   f. simultaneously gripping the cylinder outer diameter with the ring segments and the tube inner diameter with the ring peaks and thereby creating a radially rigid connection between the tube and the cylinder.

14. The method of claim 13 wherein the step of forming a length of elastic material into a ring comprises the further step of forming a length of elastic material into a ring having straight segments with respective inner surfaces thereon that have midpoints that lie along a second circle having a diameter less than the diameter of the cylinder outer diameter.

15. A method of assembling a welding gun comprising the steps of:
   a. machining a pair of annular grooves in the outer diameter of an adapter;
   b. forming a pair of retaining rings from respective lengths of elastic wire into a polygon configuration having straight segments with peaks between adjacent segments;
   c. placing the retaining rings in respective adapter grooves;
   d. pushing a welding nozzle over the adapter and the retaining rings; and
   e. elastically depressing the peaks of the retaining rings into the adapter groove with the welding nozzle and simultaneously elastically bending the segments of the retaining rings with the adapter groove and thereby producing a slip-fit radially rigid connection between the welding nozzle and the adapter.

* * * * *